June 4, 1968  M. ROSTAING  3,386,502
HEAT RECOVERY SYSTEM
Filed July 8, 1965  2 Sheets-Sheet 1
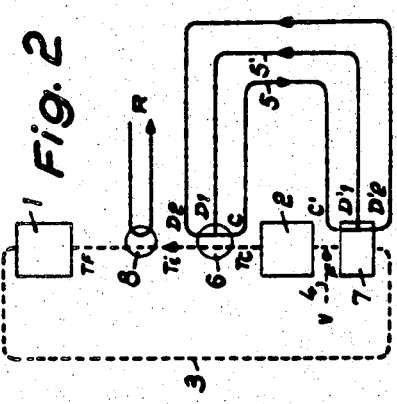
Fig. 1
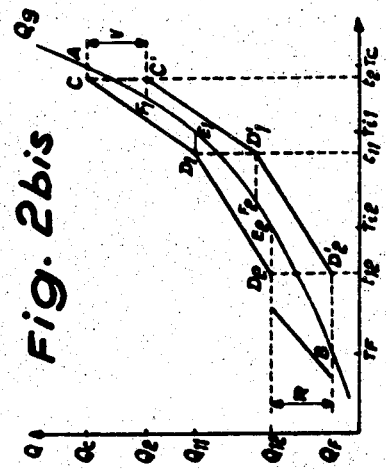
Fig. 1bis
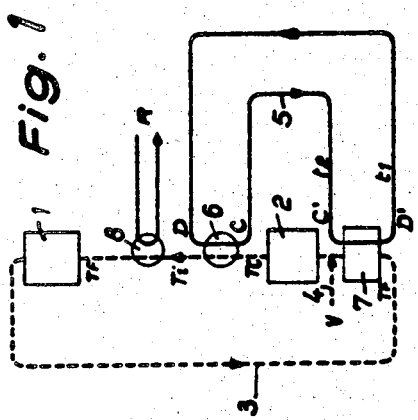
Fig. 2
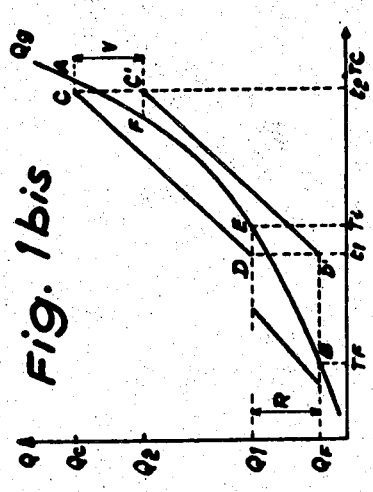
Fig. 2bis
INVENTOR
MICHEL ROSTAING
BY
Bacon & Thomas
ATTORNEYS

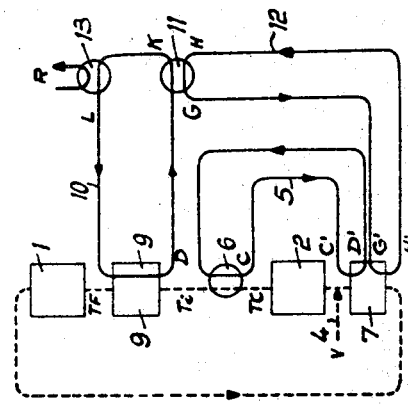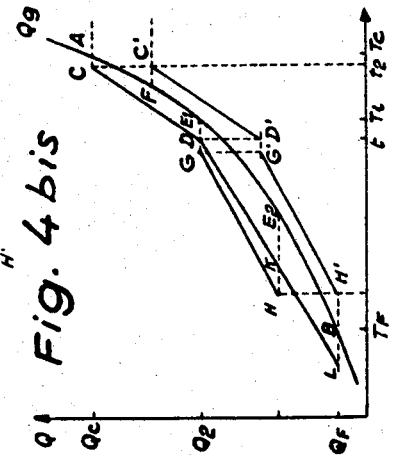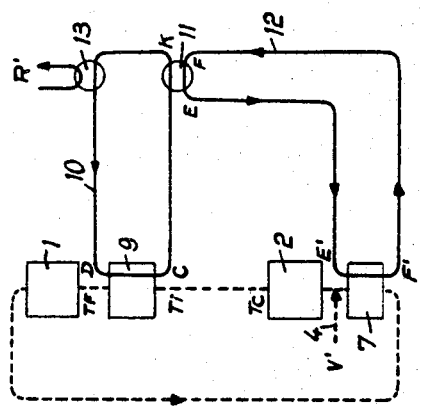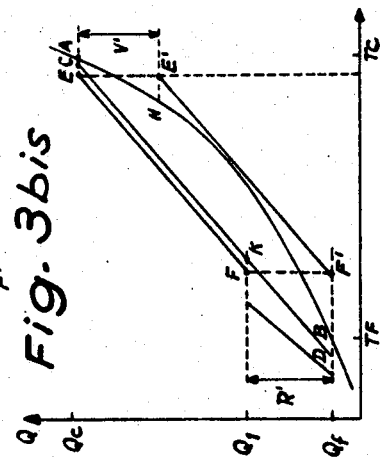

3,386,502
HEAT RECOVERY SYSTEM
Michel Rostaing, Orsay, France, assignor to Commissariat à l'Energie Atomique, a French establishment
Filed July 8, 1965, Ser. No. 470,505
Claims priority, application France, July 22, 1964, 982,550
1 Claim. (Cl. 165—106)

ABSTRACT OF THE DISCLOSURE

A heat recovery system for a cold tower and a hot tower connected by a closed circuit circulating gas between the two towers. A first liquid circuit cools the hot gas at the output of the hot tower in an indirect exchanger and transfers this heat to the cold gas before it enters the hot tower in a direct contact exchanger. A second liquid circuit removes heat from the gas in a direct contact exchanger before it enters the cold tower and transfers the heat by an indirect liquid-to-liquid exchanger to a third liquid circuit which also is connected with the direct contact exchanger arranged before the input of the hot tower.

---

The present invention has for an object a heat recovery system for an installation for producing heavy water by the method of bithermal isotopic exchange between a liquid and a gas, one of the fluids serving as a source of heavy hydrogen and the other fluid serving as an exchange medium.

In order that the invention may be more clearly understood, reference will now be made to the accompanying drawings which show some known conventional systems, together with one embodiment of the invention by way of example, and in which FIGURES 1, 2 and 3 show examples of conventional systems, FIGURES 1 bis, 2 bis and 3 bis show explanatory diagrams relative to FIGURES 1, 2 and 3 respectively.

FIGURE 4 shows an embodiment of a system according to the invention, and

FIGURE 4 bis shows an explanatory diagram relative to FIGURE 4.

Referring now to the drawings, in one conventional installation, shown in FIGURE 1, the system comprises a cold tower 1, a hot tower 2, closed circuit means 3 for circulating between the two towers, and means 4 for injecting hot vapour into the circuit, upstream of the hot tower. In an installation of this type, heat is generally recovered on the one hand by the use of an auxiliary liquid circuit 5 for cooling the hot gas in an indirect exchanger 6 and for giving up heat to the cold gas in a direct contact exchanger 7, and on the other hand by the use of an indirect exchanger 8 having cooling fluid for ensuring the second cooling phase of the hot gas leaving the first mentioned indirect exchanger 6.

The diagram shown in FIGURE 1 bis shows a graph $Q_g$ representing total heat of the gas saturated with liquid coming from the circuit 5 as a function of the temperature. The point A shows the state of the gas in the hot tower at the temperature $T_C$ and B the state of the gas in the cold tower at the temperature $T_F$.

In the exchanger 6, the gas develops from state A to state E on the graph $Q_g$ by giving the quantity of heat $Q_C-Q_1$ to the liquid in the circuit 5, and the quantity of heat $R=Q_1-Q_F$ in the exchanger 8 is given to a coolant fluid. In the exchanger 7, the recovery circuit transfers the quantity of heat $Q_2-Q_F=Q_C-Q_1$ to the gas which is reheated and which is saturated from state B to state F. An external addition of heat $(V=Q_C-Q_2)$ finally takes the gas to state A.

It will be seen that the recovery of heat is increased when CC' diminishes and the diagram simply shows that the shape of the graph $Q_g$ presents a difficulty constricting figure CC'DD' a great deal.

An improvement has been proposed by breaking up the circuit 5 into a plurality of circuits such as 5 and 5' as shown in FIGURE 2, which subdivides the straight lines CD, C'D' on the graph of FIGURE 1 bis as shown in the Diagram 2 bis to form two polygons $CD_1D'_1C'$ and $D_1D_2D'_2D'_1$.

Another system utilising to a maximum the direct exchange between liquid and gaseous phases, has also been proposed as shown in FIGURE 3 and the related Diagram 3 bis, which explain its operation. In FIGURE 3, 7 and 9 are direct contact exchangers. In the exchanger 9, the gas transfers a quantity of heat $Q_c-Q_F$ to a liquid circuit 10 which gives a quantity of heat $Q_c-Q_1'$ in an indirect exchanger 11 to a second liquid circuit 12 which transfers this quantity of heat $(Q_c-Q_1')$ to the gas passing from the cold tower to the hot tower, in the exchanger 7, whilst the first circuit 10 gives off a quantity of heat $R'=Q_1'-Q_F$ in the exchanger 13 to some coolant water.

However, the advantage due to the use of the exchanger 9 (theoretically small number of plates) is offset by the following disadvantages:

(1) The necessity of maintaining the temperature differences between A and C, between C and E and between F and K as high as possible which necessitates a large surface for the exchanger 11 and a large number of plates in the direct exchanger 7.

(2) The large number of plates necessary in the exchanger 7 in spite of the precautions taken in regard to these temperature differences, as may be seen in the drawing between HB and E'F' by reason of the curvature of the saturation line AB.

(3) In spite of the precautions taken in regard to the temperature differences and the dimensioning of the exchanger 7, the quantity of vapour to be introduced for completing the saturation and reheating of the gas, corresponding to V', is greater than V which may be achieved by the systems schematised in FIGURE 2.

Thus the present invention has for an object an improved heat recovery system for an installation for producing heavy water by the method of bithermal isotopic exchange, which does not suffer from the above-mentioned disadvantages.

To this end, this system comprises: on the one hand, an auxiliary liquid circuit for cooling the hot gas at the output of the hot tower in an indirect exchanger and for giving off heat to the cold gas before entering the hot tower, in a direct contact exchanger, and on the other hand, a second liquid circuit for removing in a direct contact exchanger the heat energy from the gas before entering the cold tower, for transferring them by means of an indirect liquid to liquid exchanger to a third liquid circuit which also serves the direct contact exchanger arranged before the input to the hot tower.

An installation of this type is shown in FIGURE 4 of the drawing and the corresponding graph diagram is shown in FIGURE 4 bis.

The indirect gas-liquid exchanger (exchanger 6, circuit 5) is used only in the high temperature zone where the coefficient of exchange is high by reason of the high condensation of vapour and the second cooling phase is ensured by a liquid circuit 10 which removes by direct contact (exchanger 9) the heat energy from the gas and transfers it, by an indirect exchanger 11, but operating on a liquid-to-liquid cycle, thus with a good transfer coefficient, to the circuit 12, which transfers this heat energy to the gas in the direct exchanger 7. The first circuit 10 gives off heat in an exchanger 13 to the coolant water R.

The graph shown in FIGURE 4 bis shows that the following advantages are obtained:

(a) The indirect exchanger 6 enables the temperature differences on the hot side to be closed up and the highest recovery to be ensured;

(b) The indirect exchanger is limited to the zone where the high condensation gives it a high efficiency and this enables, on the other hand, operation to be effected with a steep slope C′D′ which is favourable for the operation of the direct exchanger 7;

(c) The final cooling of the gas is ensured by a direct contact and the heat energy is correspondingly recovered by a liquid-liquid exchanger, the assembly being more economical than an indirect gas-liquid exchanger.

I claim:

1. In a heat recovery system for an installation producing heavy water by the method of bithermal isotopic exchange, between a liquid and a gas, one of the fluids serving as a source of heavy hydrogen and the other fluid serving as an exchange medium, said installation comprising a cold tower, a hot tower, and closed circuit means for circulating gas between said two towers, the improvement which consists in an auxiliary liquid circuit for cooling the hot gas at the output of the hot tower in an indirect exchanger and for transferring this heat to the cold gas before entering the hot tower in a direct contact exchanger, and furthermore in the provision of a second liquid circuit for removing the heat energy from the gas in a direct contact exchanger before entering the cold tower and for transferring said heat energy by means of an indirect liquid to liquid exchanger to a third liquid circuit which also is connected with the exchanger having direct contact arranged before the input of the hot tower.

References Cited

UNITED STATES PATENTS

| 3,087,791 | 4/1963 | Becker | 23—204 |
| 3,142,540 | 7/1964 | Spevack | 23—204 X |

FOREIGN PATENTS 563,883   1/1958   Belgium.

OTHER REFERENCES

German printed application No. 1,064,919, September 1959, Pintsch.

ROBERT A. O'LEARY, *Primary Examiner.*

A. W. DAVIS, *Assistant Examiner.*